US012558284B2

(12) United States Patent
Finke et al.

(10) Patent No.: US 12,558,284 B2
(45) Date of Patent: Feb. 24, 2026

(54) DEVICE FOR SUPPORTING AT LEAST ONE ARM OF A USER AND FOR SUPPORTING AT LEAST ONE UPPER ARM

(71) Applicant: Ottobock SE & Co. KGaA, Duderstadt (DE)

(72) Inventors: Lars Benjamin Finke, Landolfshausen (DE); Olaf Kroll-Orywahl, Northeim (DE); Markus Tüttemann, Waltrop (DE); Michael Bremer, Göttingen (DE); Maximilian Anton Merker, Wuppertal (DE); Oliver Mizera, Göttingen (DE); Markus Mladek, Gleichen (DE); Fabienne Röschel, Göttingen (DE); Benjamin Schirrmeister, Göttingen (DE); Carsten Vogel, Duderstadt (DE); Jonas Bornmann, Duderstadt (DE); Michael Lanzinger, Neufraunhofen (DE); Simon Käsmann, Munich (DE); Pascal Schwedhelm, Duderstadt (DE)

(73) Assignee: Ottobock SE & Co. KGaA, Duderstadt (DE)

( * ) Notice: Subject to any disclaimer, the term of this patent is extended or adjusted under 35 U.S.C. 154(b) by 889 days.

(21) Appl. No.: 17/218,417

(22) Filed: Mar. 31, 2021

(65) Prior Publication Data

US 2021/0275380 A1 Sep. 9, 2021
US 2022/0031551 A2 Feb. 3, 2022

Related U.S. Application Data

(63) Continuation-in-part of application No. PCT/EP2019/080059, filed on Nov. 4, 2019.

(30) Foreign Application Priority Data

Nov. 5, 2018 (DE) ..................... 10 2018 127 553.6

(51) Int. Cl.
*A61H 1/02* (2006.01)
*B25J 9/00* (2006.01)

(52) U.S. Cl.
CPC .......... *A61H 1/0274* (2013.01); *B25J 9/0006* (2013.01); *A61H 2201/1261* (2013.01); (Continued)

(58) Field of Classification Search
CPC .. A61H 1/0274; A61H 1/0277; A61H 1/0281; A61H 2201/1253; (Continued)

(56) References Cited

U.S. PATENT DOCUMENTS 2,661,000 A * 12/1953 Gazeley ................ A61F 5/3753
602/16
5,167,612 A * 12/1992 Bonutti ................. A61F 5/0123
602/5
(Continued)

FOREIGN PATENT DOCUMENTS

DE 102016121203 A1 5/2018
KR 101896181 B1 * 9/2018 ........... A61H 1/0218
(Continued)

OTHER PUBLICATIONS

Machine Translation of KR-101896181-B1. Accessed from PE2E Search tool on Jan. 2024. (Year: 2018).*

*Primary Examiner* — Kendra D Carter
*Assistant Examiner* — Jaeick Jang
(74) *Attorney, Agent, or Firm* — WCF IP

(57) ABSTRACT

A device for supporting at least one arm of a user, has one or more arm support elements, each of which has an arm shell for mounting on an arm. Passive actua-tor(s) are configured to exert a force on an arm support element by way of which an upward movement of the arm in the arm shell is supported when the device is in the mounted state.

(Continued)

The device includes at least one counter bearing for the force to be applied, and at least one actuating element, the actuation of which allows the actuator to be moved into a first state where the actuator exerts the force on the at least one arm support element, and into a second state in which it exerts a smaller or no force on the arm support element.

2 Claims, 17 Drawing Sheets

(52) U.S. Cl.
CPC ................. *A61H 2201/149* (2013.01); *A61H 2201/1635* (2013.01); *A61H 2201/165* (2013.01); *A61H 2201/1671* (2013.01)

(58) Field of Classification Search
CPC .... A61H 2201/1261; A61H 2201/1284; A61H 2201/14; A61H 2201/1445; A61H 2201/1454; A61H 2201/1463; A61H 2201/1472; A61H 2201/1481; A61H 2201/149; A61H 2201/1602; A61H 2201/1614; A61H 2201/1616; A61H 2201/1638; A61H 2201/1645; A61H 2201/163; A61H 2201/165; A61H 2201/1652; A61H 2201/1657; A61H 2201/1664; A61H 2201/1666; A61H 2201/1669; A61H 2201/1671; A61H 2201/1673; A61H 2201/1676; A61H 2201/0165; A61H 2201/0173; A61H 2205/06; A61H 2205/062; A61H 2205/084; B25J 9/0006; B25J 9/104; A61F 5/01; A61F 5/0102; A61F 5/0118; A61F 5/013; A61F 5/3715; A61F 5/3723; A61F 5/3753; A61F 2005/0132; A61F 2005/0134; A61F 2005/0137; A61F 2005/0139; A61F 2005/0146; A61F 2005/01553; A61F 2005/0155; A61F 2005/0158; A61F 2005/0162; A61F 2005/0165; A61F 2005/0167; A61F 2005/0179; A61F 2/54; A61F 2/581; A61F 2002/543; A61F 2002/546; A61F 5/04–048; A61F 5/3761; A63B 21/40; A63B 21/4017; A63B 22/00; A63B 22/0002; A63B 23/12
See application file for complete search history.

(56) References Cited

U.S. PATENT DOCUMENTS

| | | | | |
|---|---|---|---|---|
| 10,596,059 | B2 * | 3/2020 | Angold ...................... | A45F 3/08 |
| 10,758,390 | B2 * | 9/2020 | Sorrenti ............ | A63B 23/0494 |
| 11,413,207 | B2 * | 8/2022 | Kim ...................... | A61H 1/0281 |
| 11,504,258 | B2 * | 11/2022 | Hardt ..................... | B25J 9/0006 |
| 2012/0184880 | A1 * | 7/2012 | Doyle .................... | B25J 9/0006 |
| | | | | 601/33 |
| 2016/0081871 | A1 | 3/2016 | Doyle | |
| 2016/0256310 | A1 * | 9/2016 | Blecher ................ | A61F 5/0123 |
| 2016/0339583 | A1 * | 11/2016 | Van Engelhoven ... | B25J 9/0006 |
| 2022/0304883 | A1 * | 9/2022 | Patton .................. | A61H 1/0237 |
| 2023/0338179 | A1 * | 10/2023 | Kaesmann .......... | B25H 1/0028 |

FOREIGN PATENT DOCUMENTS

| | | | | |
|---|---|---|---|---|
| WO | WO-2016065350 A1 * | 4/2016 | ............ | A61F 5/013 |
| WO | WO-2020204009 A1 * | 10/2020 | ............ | B25J 9/0006 |

* cited by examiner

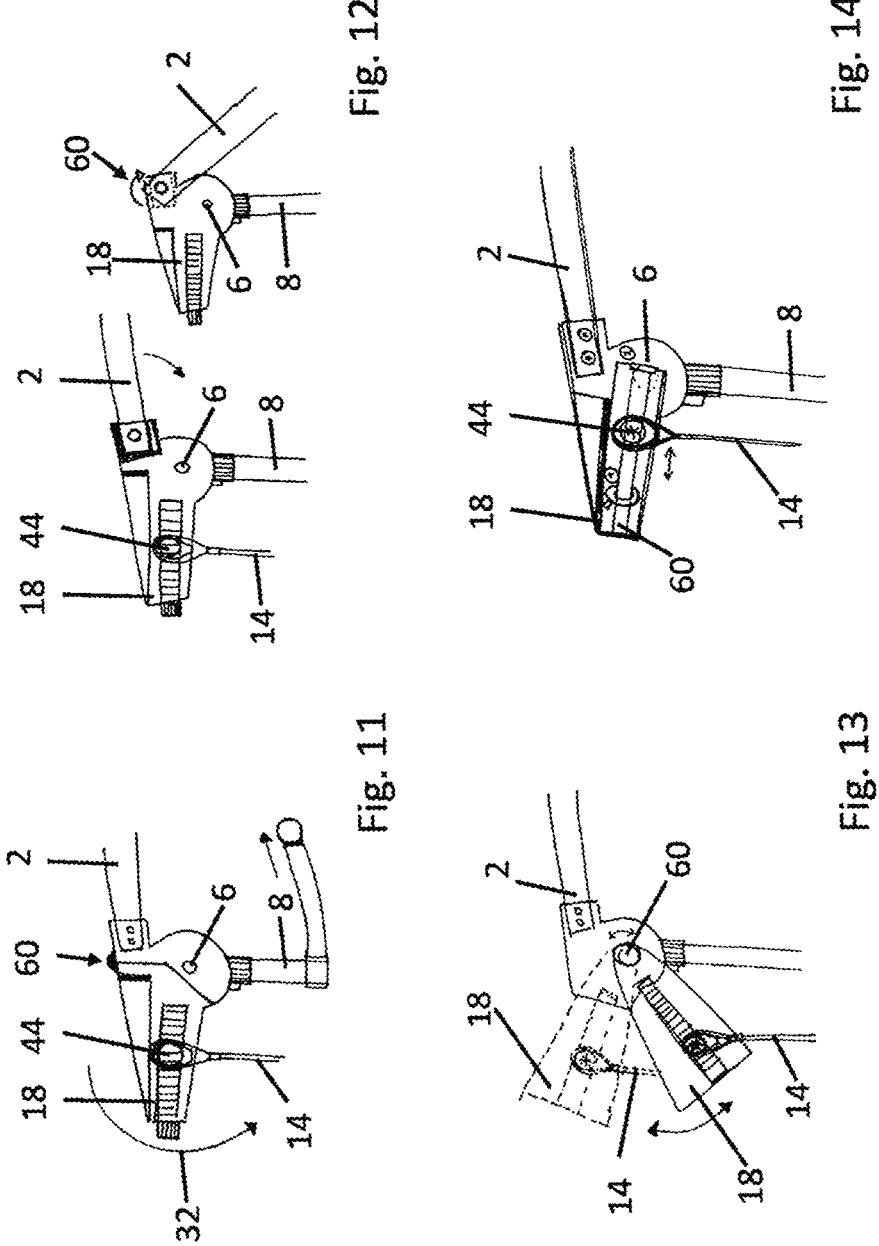

DEVICE FOR SUPPORTING AT LEAST ONE ARM OF A USER AND FOR SUPPORTING AT LEAST ONE UPPER ARM

CROSS-REFERENCE TO RELATED APPLICATIONS

This application is a continuation-in-part application of PCT/EP2019/080059 filed Nov. 4, 2019 which itself claims priority to German Application 10 2018 127 553.6 filed Nov. 5, 2018.

FIELD OF THE INVENTION

The invention relates to a device for supporting at least one arm of a user, wherein the device comprises at least one arm support element, in each case with an arm shell for mounting on one arm, at least one passive actuator which is configured to exert a force on at least one of the arm support elements, by way of which an upward movement of the arm in the arm shell is supported when the device is in the mounted state, and at least one counter bearing for the force to be applied.

The invention also relates to a device for supporting at least one upper arm of a user, wherein the device comprises at least one arm support element with an arm shell for mounting on the upper arm, at least one passive actuator, which has a first end and a second end and is configured to apply a force to the at least one arm support element, and at least one counter bearing for the force to be applied.

BACKGROUND

Conventionally, the counter bearing has a force transmission element and a counter bearing element. The force transmission element serves to dissipate a counter force to the force to be applied by the actuator into the counter bearing element, which is designed, for example, to dissipate the force into the wearer's body, for example into the hip. Counter bearing elements, which are configured to dissipate the force, for example, into the ground on which the wearer of the device is stand-ing or walking, are also known from the prior art.

This type of device is described, for instance, in US 2016/0081871 A1. It features a counter bearing element that is designed in the form of a strap that can be placed around torso of the user. Two support braces run along the user's back to his shoulder, each of said support braces being connected to a joint above and laterally next to the shoulder of the user, such that the arm can be raised. Spring elements are arranged on the corresponding joints, by means of which an upward force can be exerted on the arm shells, such that the arms are supported, for example when lifting heavy objects or when working above one's head. If the arms are lowered, a pressure must be exerted by the arms onto the arm shells, wherein this pressure exceeds the force applied by the spring elements, thereby causing the arms to lower.

WO 2014/0093408 A2 and U.S. Pat. No. 9,427,865 B2 describe similar devices, feature a spring, especially a ten-sion spring, that is connected to a Bowden cable, said spring functioning as a mechanical energy storage device which acts a passive actuator. Said cable is guided by way of a pulley in such a way that, upon a swivel-ling of the arm, meaning a movement of the arm support element relative to the counter bearing element, the spring is stretched, such that the mechanical energy storage device is charged with energy.

In particular, if the user of the device trips or falls for instance and has to roll over, for example, these types of device may be hazardous for the user and lead to inju-ries. This may occur even though the joints of the device that are arranged outside of the shoulder joint are, according to the prior art, arranged as precisely as possible so that their joint axes and swivel axes pass through the corresponding axis of the shoulder joint, such that supposedly all movements that the natural shoulder and hence the arm of the user can execute can be imitated.

An active device that supports arms while work is being performed above a user's head is described in EP 3 156 193 A1. The arm shells are connected to one another by a number of different joints and frame elements. This should render as many movements as possible which are executable by a shoulder joint also possible with the mounted device. Further support devices, especially devices which support the lifting of heavy objects or work performed above a user's head, are known from WO 2014/195373 A1 and US 2016/339582 A1, for example.

The disadvantage of all of these devices is that the force exerted on the respective arm shell is permanently present. Specifically, this means that the arm support elements are in the upward-reaching position when the device is being mounted, so that they first have to be pushed downwards in order to insert the arm in the respective arm shell. This is inconvenient and requires space; as such, there is a risk of hitting other objects with the extended arm support ele-ments.

In addition, when removing the device, the moment the arm is removed from the arm shell, there is a rapid upward movement of the arm support elements, which can cause damage to other objects or even injury to the user.

US 2017/0173783 A1 describes an operating principle with which this problem does not occur. Unlike with the devices described here, the actuator is not able to apply a force to the arm support element that supports an upward movement of the arm in the arm shell. Rather, a mechanical spring is used exclusively to make a downward movement more difficult. Therefore, if an arm arranged in this device is not lowered, no force is exerted. Especially when lifting heavy objects, this device, unlike the other previously men-tioned embodiments, is therefore of no help.

Furthermore, depending on the activity being carried out by the wearer of the device, it may be advantageous to allow forces of different strengths to be applied by the passive actuator. The adjustability of the forces is also advantageous in the event that one and the same device is to be used for different users. A range of possibilities for adjusting the force are known from the prior art. For example, it is possible to replace the actuator with another actuator that is configured to apply a greater or smaller force. In addition, it is also known to shift a force application point at which an end of the actuator is connected to the arm support element, for example. The arm support element is preferably arranged, for example, on the force transmission element such that it can be rotated about an axis of rotation, so that an effective lever length can be changed by shifting the force application point. This naturally changes the torque gener-ated.

However, it is disadvantageous that to achieve this, at least one end of the actuator usually has to be released. In particular with actuators that contain elastic elements, there is then a risk that the end will be released without the actuator being completely relaxed. If the released end is then accidentally or prematurely released, the energy of the actuator is suddenly discharged and the now free end of the actuator can swing around uncontrollably and cause personal injury and property damage.

SUMMARY

The invention thus aims to remedy these disadvantages or at least to reduce them.

In particular embodiments, the invention therefore aims to further develop a device where the force to be applied can be adjusted, without incurring the risk of a free end of the actuator causing damage.

The invention solves the task with a device comprising at least one actuating element, the actuation of which allows the actuator to be moved into a first state, in which the actuator exerts the force on the arm support element, and into a second state, in which it exerts a smaller or no force on the at least one arm support element. Preferably, the device has at least one force transmission element that is configured to transmit a counter force from the at least one arm support element to the counter bearing element.

When the device is not mounted, the actuator is preferably in the second state, so that, especially preferably, no force is exerted on the arm support element. The user of the device can therefore put it on and and move the arm support elements with the arm shells into the most comfortable position for mounting. Here, the arm support elements are usually oriented downwards, so that the respective arm can be easily inserted into the arm shell. As soon as the arms are in the arm shells and the arm shells have been closed around the arm as necessary, the device is in the mounted state. In this case, by actuating the at least one actuating element, the actuator can be brought into the first state in which it applies the support force to at least one of the arm support elements.

In the first state, the actuator preferably exerts a maximum force on the at least one arm support element. Consequently, the first state is preferably defined in such a way that a further increase in force by the actuator is not possible, in particular by actuating the at least one actuating element.

Preferably, the actuator can be moved from the first state into the second state in several steps or continuously by actuating the at least one actuating element, wherein the force exerted by the actuator on the at least one arm support element decreases. It is especially preferable if the actuator can be brought into at least one intermediate state, but preferably several intermediate states, by actuating the at least one actuating element, so that the force exerted by the actuator on the at least one arm support element can be adjusted in steps or continuously. The actuating element is preferably arranged on an underside of the arm shell, on a joint that connects the arm support element and the force transmission element such that they can be swivelled, or laterally on the outside of the arm shell or on the arm support element. The underside of the arm shell refers to the side that faces away from the user's arm in the mounted state. When the arm is not raised, it is arranged between the torso and the arm. Laterally on the outside refers to the side that faces away from the torso in the mounted state when the arm is not raised.

This allows the force exerted by the actuator to be freely selected and adapted to meet the personal needs of the wearer of the device. For example, if a force application point, at which the actuator acts on the arm support element, is displaced relative to a swivel axis about which the arm support element can be swivelled, for example, relative to the force transmission element, the corresponding lever also changes so that the applied torque is altered. This is understood as a change in the "force exerted".

It is advantageous if the at least one actuator features at least one elastic element that can be relaxed by moving the actuator out of the first state into the second state by actuating the at least one actuating element. The elastic element may be, for example, a spring, such as a tension spring, an elastic element, such as an expander, or another element, which is preferably pre-tensioned in the first state of the actuator and is responsible for the force exerted.

A fastening element is preferably located at one end of the elastic element, wherein said fastening element can be moved, especially swivelled or displaced, by actuating the at least one actuating element. Preferably, this movement of the end of the elastic element is damped, for example by way of a spring element, a damping element and/or a controlled applied frictional force. This prevents the elastic element, which may be, for example, an expander, from springing back uncontrollably.

Preferably, the end of the elastic element is locked in the first position, in which the actuator exerts the maximum force on the arm support element. This preferably occurs automatically when and by reaching the first position. To this end, a modified "push-push" mechanism and/or a switch lever can be used, for example. By actuating the actuating element again ("pulling over"), the lock is released again and the actuator can be brought into the second state.

A securing device is preferably provided, for example in the form of a latching device with a latching element and a latching undercut, which ensures that the actuator can only be brought from the first state to the second state and/or vice versa when the device is mounted.

The actuating element is preferably self-locking.

The actuating element may be, for example, a cable pull, a cord or a strap that is arranged on the fastening element. The fastening element itself is mounted such that it can be displaced along a rod, for example, which may also serve as a force transmission element for the force applied by the actuator. One end of the actuating element can be fixed to another component of the device, for example a strap placed around the torso. Positive-locking elements in the form of press studs or velcro elements are provided for this purpose, for example. When mounting the device, this end of the actuating element is not fixed to another component of the device, for example, or in a position in which the elastic element is relaxed. Once the device has been mounted, when the arm shells are closed around the arm or the arm is at least arranged in the arm shells, a tension can be exerted on the actuating element which causes a displacement of the fastening element, on the end of which the elastic element is located. As a result, the end of the elastic element is also displaced and the elastic element thus stretched and tensioned. In this position, the end of the actuating element is fixed via the above-specified mecha-nisms, so that the fastening element and therefore the end of the elastic element are also fixed. In this case, the actuator is in the first state and exerts a force on the arm support element.

If the device is to be removed, the end of the actuating element can be released. The force of the elastic element displaces the end of the elastic element where the fastening element and the actuating element are located, so that the elastic element is relaxed and the actuator is in the second state. The device can then be safely removed, without any jerky movements occurring.

It is especially advantageous if the actuating element can be actuated by the user of the device once the user has mounted the device.

As an alternative to the actuating element designed as a tension element, for example a strap or cord, a switch lever, a tension lever or another device may be provided for displacing the end of the elastic element. This device is preferably self-locking.

Alternatively or additionally, the actuating element may be designed as a rotary knob. Such a design of the actuating element is offered, for example, by the com-pany BOA.

Alternatively or additionally, the counter bearing features at least one counter bearing element and at least two force transmission elements, wherein each arm support element is arranged on one of the force transmission elements such that it can be swivelled about a swivel axis. The counter bearing element can be, for example, a hip strap, which can of course be padded, or another element arranged on the user's body. The two force transmission elements are located on said element, wherein said force transmission elements may be a rod that points upwards. At the end of the rod opposite the counter bearing element, there is a swivel joint with a swivel axis, via which the respective arm support element is arranged on the force transmission element.

Preferably, the force exerted by the actuator runs along a force direction which runs closer to the swivel axis in the second state of the actuator than in the first state of the actuator. The force itself acts, for example, on a lever that is firmly connected to the arm support element or is part of the arm support element, and is spaced apart from the swivel axis of the swivel joint. In this way, the force applied by the actuator applies a torque to the arm support element about the swivel axis, resulting in the supporting force. The longer the lever element on which the force acts, the greater the torque and therefore the resulting force. By means of the actuating element, it is preferably possible to change this direction of force and to move it closer to the swivel axis in the second state of the actuator. It is particularly advantageous if the direction of force in the second state passes through the swivel axis. If the at least one passive actuator is, for example, an elastic element, such as a spring or a tension spring, it is not necessary to displace an end of the element and relax the actuator. Rather, the direction of the actuator or merely the direction of the force applied is changed in such a way that it runs from the force application point, which is located, for example, on the lever specified above, towards the swivel axis. Such a force does not result in a torque about the swivel axis, so that no supporting force is exerted on the arm support element.

It is advantageous if the actuator features an elastic element, on which at least one tension element is arranged, on which a tensile force can be exerted by actuating the actuating element when the actuator is in the first state. Such a tension element is, for example, a cable, a wire or a strap. The actuating element may be a winding mechanism, for example, via which the tension element can be wound up. The distance between the actuating element arranged on the arm support element, in particular the arm shell, for example, and the connection between the tension element and the elastic element can thus be reduced. In this way, the connection between the tension element and the elastic element can be moved closer to the swivel axis of the swivel joint through clever arrangement of the individual components and, in the optimum case, be brought into overlap with it.

In this example of an embodiment, if the actuator is brought back into the first position, it is sufficient, for example, if the winding mechanism can be released and a tensile force is applied to the tension element in the opposite direction by the elastic element that is still tensioned. As a result, the actuator is moved back into the first state.

Preferably, each arm shell features a closing element with which the arm shell can be closed around the user's arm. This prevents the arm from inadvertently slipping or moving out of the respective arm shell, which would cause an uncontrolled movement of the arm support element.

It is especially advantageous if the closing element can only be opened when the actuator is in the second state. To this end, a mechanical lock or unlocking device may be provided, for example. This ensures that the device cannot be removed when the actuator is in the first state.

It is particularly preferable if the device has two arm support elements, each of which has an arm shell for mounting on one arm, and particularly preferably, two force transmission elements. It has been proven especially advantageous if the device also has at least two actuators in order to be able to individually adjust the supporting forces to be applied to the different arm support elements. The actuators can preferably be brought into a first state and a second state via at least one actuating element in each case, especially preferably independently of one another, wherein the actuator exerts a smaller or no force on the arm support element in the second state compared to the first state.

With respect to embodiment focused on supporting at least one upper arm embodiments of the invention, the task is solved with a device comprising at least one deflector element against which the at least one actuator rests and whose type, shape, position and/or orientation relative to the arm support element can be changed in such a way that the force which can be applied by the actuator can be adjusted.

In particular, the at least one passive actuator is not a motor. The required energy it needs to apply the force is produced by the user or wearer of the device. Gener-ally speaking, the force that is to be applied to the arm support element counter-acts the force of gravity. When the upper arm and the connected arm support element are raised, energy is withdrawn from the energy storage device of the passive actuator. The counter movement, i.e. lowering the arm, occurs against the applied force, so that energy is supplied to the energy storage device of the passive actuator. For a passive actuator within the meaning of the present invention, this is the only source of energy if one dispenses with an adjustable pre-load of the energy storage device of the passive actuator, which is possible, but not essential.

The passive actuator preferably features at least one energy storage system, preferably at least one mechanical energy storage system. For instance, this may comprise a spring element, a pressure accumulator, a pneumatic and/or hydraulic system and/or a hydraulic energy storage system. The spring element, for example, may be arranged directly on the joint between the compressive force transmission element and the arm support element in the form of a rotational spring or a constant force spring. Elastic elements in the form of elastic cables, such as rub-ber cables, are also conceivable, one end of which is arranged on a part of the arm support element. If the arm support element is swivelled about the swivel axis relative to the compressive force transmission element, the elastic element is stretched or compressed, such that energy is either supplied to or with-drawn from the mechanical energy storage system. Of course, other elements, such as gas springs or compression springs, are also conceivable, for which a deflection is used to transform the compressive force coming from the com-pression spring into a tensile force.

A transmission element may be arranged at one or both ends of the passive actuator which transmits the force generated by the actuator to the respective component. This may be, for example, a Bowden cable or a tensile force transmission element, for example in the form of a wire or a cable, or a compressive force transmission element, for example in the form of a rod. The combination of the actual actuator, for example in the form of the elastic element, and the transmission elements arranged on one or two of its ends, is understood as a "passive actuator" within the meaning of the present invention. Consequently, it is sufficient for the invention for the actuator itself or the Bowden cable or the transmission element, which is connected to one end of the actuator and transmits its force to a component of the device, rests on the at least one deflector element. The transmission element itself can be designed to be elastic or inelastic, irrespective of the design of the passive actuator. The force transmission element however, which is part of the counter bearing, is never part of the passive actuator.

The design according to the invention allows the force applied by the passive actuator to be adjusted, without changing the position of the arm. To this end, one of the properties of the deflector element is changed. For example, it is possible to change the shape, particularly the outer contour, of the deflector element against which the at least one passive actuator rests. For this purpose, it may be sufficient to rotate the deflector element about an axis of rotation so that the passive actuator rests against another part of the contour of the deflector element. On the one hand, this allows a tension of the passive actuator to be changed. If the changed part of the contour is, for example, longer than the original part, the passive actuator is no longer tensioned, so that a greater force is exerted. On the other hand, the direction of the force applied by the actuator can be changed. By changing the contour of the deflector element, it is possible to change the direction in which the passive actuator extends from the deflector element towards one of the ends of the actuator.

Additionally or alternatively, the position of the deflector element can be changed. This also allows the distance to be bridged by the passive actuator from its first end to its second end to be increased or decreased, so that the force applied by the actuator is also increased or decreased. The direction of one or both sections of the passive actuator from the deflector element to the first and/or to the second end can also be modified and adapted in this way, whereby the force applied by the actuator to the arm support element can also be changed By changing the position of the deflector element, it is also possible to change the effective lever length of the acting force.

Alternatively or additionally, the type of deflector element can be changed. For example, it is possible to use several deflector elements with the same or a different contour, wherein the actuator is not guided across all of the existing deflector elements. If the actuator is guided across other deflector elements, the force and/or direction can be changed. Preferably, the pre-load of the actuator can also be changed or adjusted in such a way that the change in pre-load that can be caused by the change in a property of the at least one deflector element is compensated for, so that the pre-load remains almost or completely the same overall.

It is advantageous if a first position, at which the first end of the actuator is arranged on a component of the device, and a second position, at which the second end of the actuator is arranged on the component of the device, cannot be changed. It is therefore not only unnecessary, but impossible to release the actuator in order to adjust the force that can be applied by the actuator on the arm support element. The danger of the end of the actuator flapping around uncontrollably is safely eliminated in this design.

In a preferred embodiment, the at least one deflector element can be moved along a predetermined track, preferably a straight line, especially preferably along a component of the device. The deflector element can be, for example, a peg, pin or another component which can be moved along a slot, for example. The slot may be designed to be straight, curved or in a free form. An oval, circular or polygonal shape of the slot is possible.

The at least one deflector element is preferably arranged on the peg or pin. This at least one deflector element is preferably arranged such that it can be detached, so that it can be replaced with other deflector elements if necessary. It is especially preferable if the at least one deflector element is arranged such that it can be rotated about the pin or peg, wherein it is particularly preferable if it can be fixed in different orientations relative to the pin. In a fixed state, the orientation relative to the pin therefore cannot be changed, so that once the force has been set, said force preferably depending on the orientation of the deflector element relative to the pin, it cannot be accidentally or inadvertently changed. To this end, a lock or locking device may be provided that can be brought into a locked state, in which the orientation of the deflector element relative to the pin cannot be changed. It can also be brought into a released state, in which the orientation can be changed.

DESCRIPTION OF THE DRAWINGS

In the following, an example of embodiments of the present invention will be explained in more detail by way of the attached figures: They show.

DETAILED DESCRIPTION

Figures 1, 2:
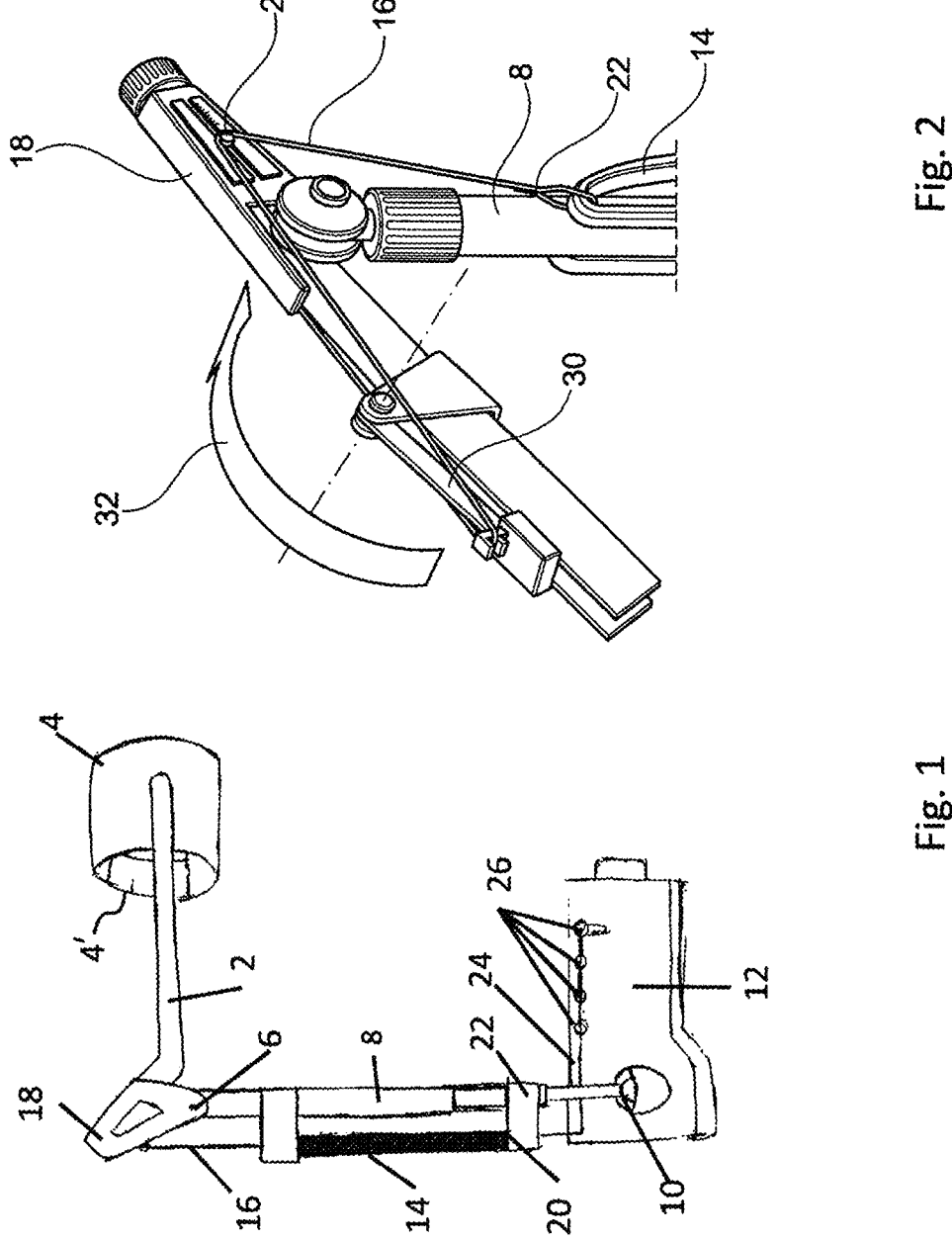
FIG. 1—the schematic representation of a part of a device according to a first example of an embodiment of the present invention, FIG. 2—the schematic representation of an alternative embodiment, Please amend the paragraph on page 13, at line 27, as follows.

FIG. 1 depicts a part of a device according to a first example of an embodiment of the present invention. It shows an arm support element 2, on which an arm shell 4 with a closing element 4' is located. The arm support element 2 is arranged via a swivel joint 6 on a force transmission element 8 such that it can be swivelled, said force transmission element being arranged with its lower end 10 on a counter bearing element 12. The counter bearing element 12 is an abdominal strap or a hip strap that is placed around the body of the wearer of the device.

A passive actuator 14 is located on the force transmission element, wherein said actuator is depicted as an elastic element in the example of an embodiment shown. It is connected via a Bowden cable 16 to a lever element 18, on which the arm support element is 2 is situated. An end 20 of the passive actuator 14 is arranged with a fastening element 22 on the force transmission element 8 such that it can be displaced. The fastening element 22 features an actuating element 24 in the form of a band or a strap, via which a tensile force can be exerted on the fastening element 22 and thus the end 20 of the passive actuator 14. Positive-locking elements, such as velcro elements, press studs or other fastening elements are arranged on the counter bearing element 12 in various fastening positions 26, so that the actuating element 24 can be fixed in different positions on the counter bearing element 12. As a result, on the one hand, the passive actuator can be brought from the first state shown in FIG. 1 into the second state and vice versa and, on the other hand, a pre-load exerted by the passive actuator can be adjusted in steps for a plurality of intermediate states between the first state and the second state.

FIG. 2 shows an alternative embodiment. The Bowden cable 16 arranged on the passive actuator 14, is guided via a pulley 28 and is arranged with one end on a tension lever 30. In the example of an embodiment shown, the fastening element is provided in the form of a loop. The tension lever 30 is in the first position, in which the passive actuator 14 is tensioned. If the tension lever 30 is moved along the arrow 32, the passive actuator 14 is relaxed and thus transferred into the second state continuously.

Figures 3, 4, 5:
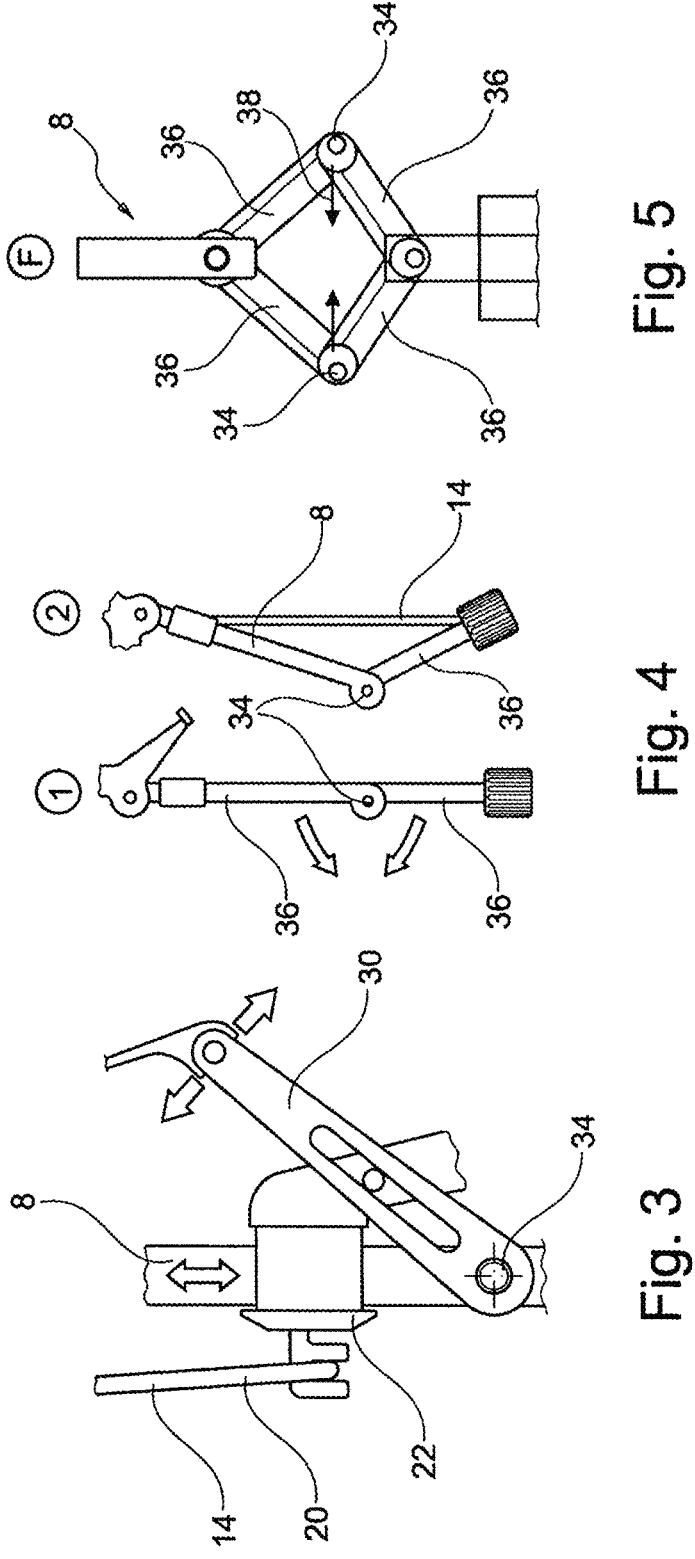
FIGS. 3 to 5—further examples of embodiments for corresponding actuating elements, FIG. 6—the schematic representation of a further embodiment of the present invention, FIG. 7—the device from FIG. 6 with the actuator in the second state, FIG. 8—the schematic representation of a further example of an embodiment, FIG. 9—the representation from FIG. 8 with the actuator in the second state, FIG. 10—the schematic representation of a securing device, and FIGS. 11 to 16—schematic representations of different embodiments.

FIGS. 3, 4 and 5 depict further examples of embodiments for corresponding actuating elements. In FIG. 3, the fastening element 22 is mounted on the force transmission element 8 such that it can be displaced, wherein an end 20 of the passive actuator 14 is located on said fastening element. By means of a tension lever 30, which is arranged on the force transmission element 8 such that it can be swivelled about a swivel axis 34, the fastening element 22 can be displaced and the passive actuator 14 thus brought into the first state or the second state.

FIG. 4 depicts a further embodiment. The force transmission element 8 is com-posed of sub-elements 36 which are mounted on each other such that they can be swivelled about a swivel axis 34. In the left-hand part of FIG. 4, the two sub-elements 36 form a straight embodiment of the force transmission element 8, by way of which a passive actuator 14 arranged parallel to the force transmission element is stretched and thus tensioned. In the right-hand part of FIG. 4, the force transmission element 8 is bent in so that the length of the passive actuator 14 is shortened, thereby relaxing the actuator. The actuator 14 is thus in the first state in the left-hand part of FIG. 4 and in the second state in the right-hand part.

FIG. 5 depicts another embodiment with four sub-elements 36 arranged in the force transmission element 8, said sub-elements being mounted such that they can be swivelled about two joint axes 34. A clamping element 38 is located between them, by means of which the distance between the two swivel axes 34 can be changed. In the example of an embodiment shown, a passive actuator arranged parallel to the force transmission element 8 is in the second state. If the distance between the two swivel axes 34 is reduced, the extension in FIG. 5 from top to bottom of the force transmission element 8 is increased and the passive actuator 14 arranged parallel is tensioned and thus transferred into the first state.

Figure 6:
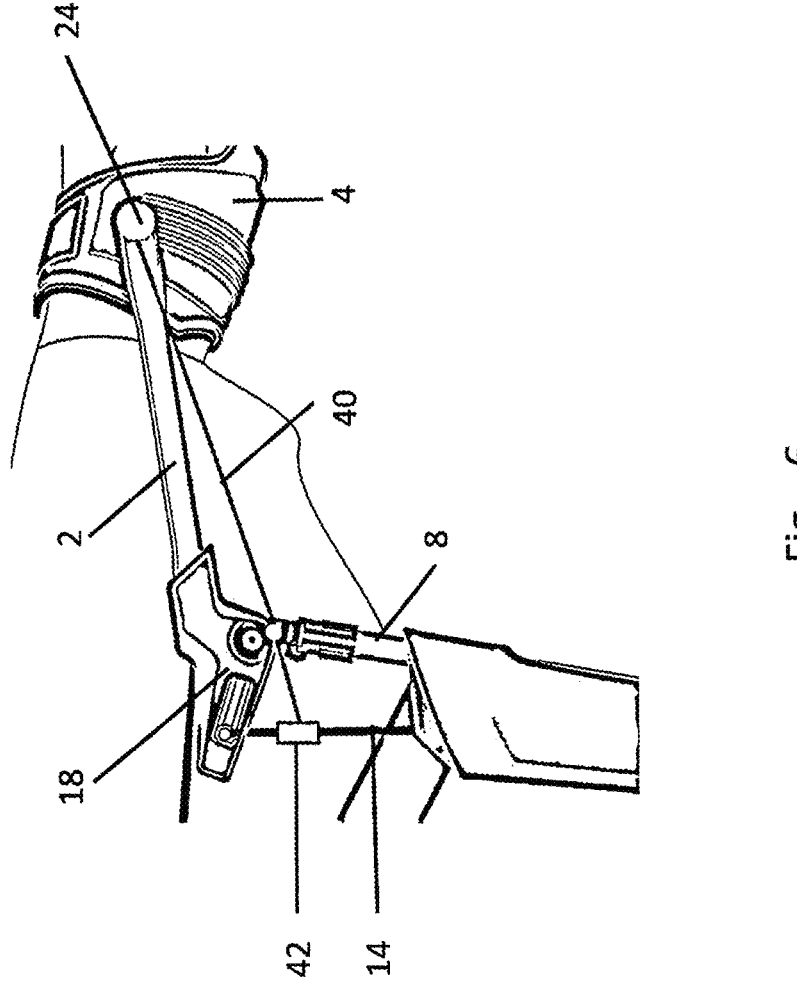
Figure 7:
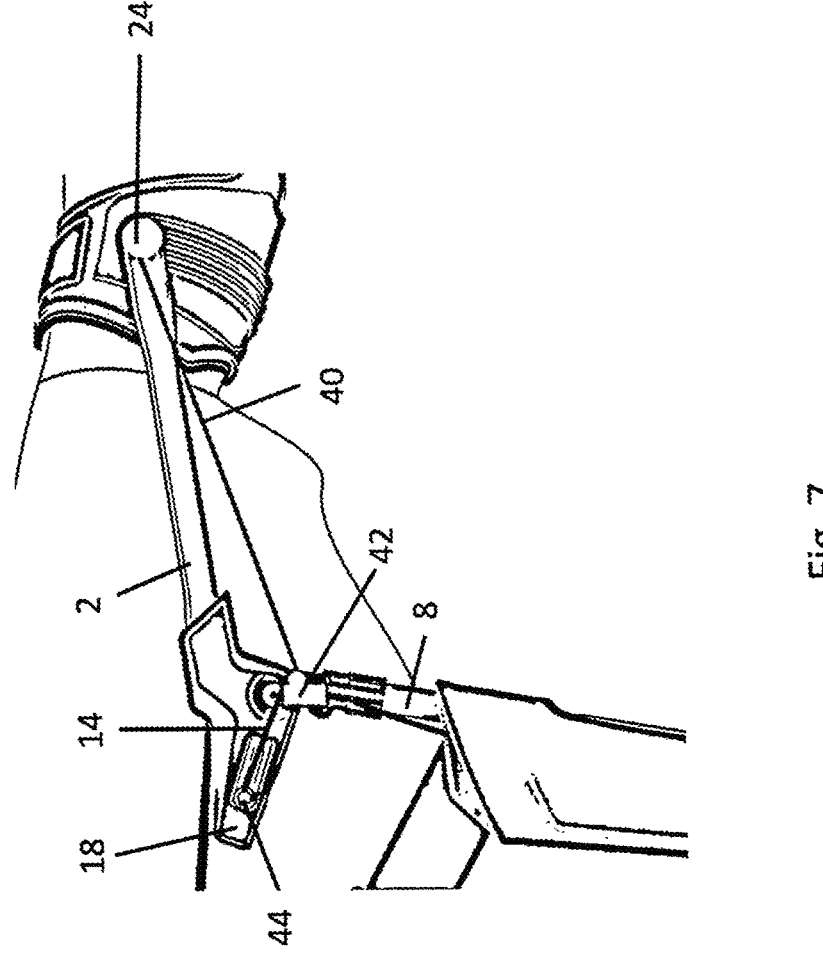

FIG. 6 shows another alternative configuration. The passive actuator acts on the lever element 18, which is connected to the arm support element 2. The arm support element 2 is arranged on the force transmission element 8 such that it can be swivelled. In the example of an embodiment shown, the actuating element 24 is located on the arm shell 4 and configured to wind up a tension element 40. The tension element 40 is arranged on the passive actuator 14 via a connector 42. In fig-ure 6, the actuator 14 is in the first state. The tensile force exerted on the lever element 18 by the passive actuator 14 causes a torque about the swivel axis about which the arm support element 2 is arranged on the force transmission element 8. This allows for a supporting force to be exerted on the arm support element 2. Figure 7 depicts the representation with the actuator 14 in the second state. The actuating element 24 has wound up part of the tension element 40, thereby exerting a tensile force on the connector 42. It can be seen that the upper part of the passive actuator 14, which acts on the lever element 18, is now directed immediately towards the swivel axis about which the support element 2 can be swivelled relative to the force transmission element 8. The force exerted therefore does not cause a torque.

It can also be seen in FIGS. 6 and 7 that an application point 44 is designed to be displaced in an elongated hole provided for this purpose. This renders it possible to set an amount of the supporting force.

Figure 8:
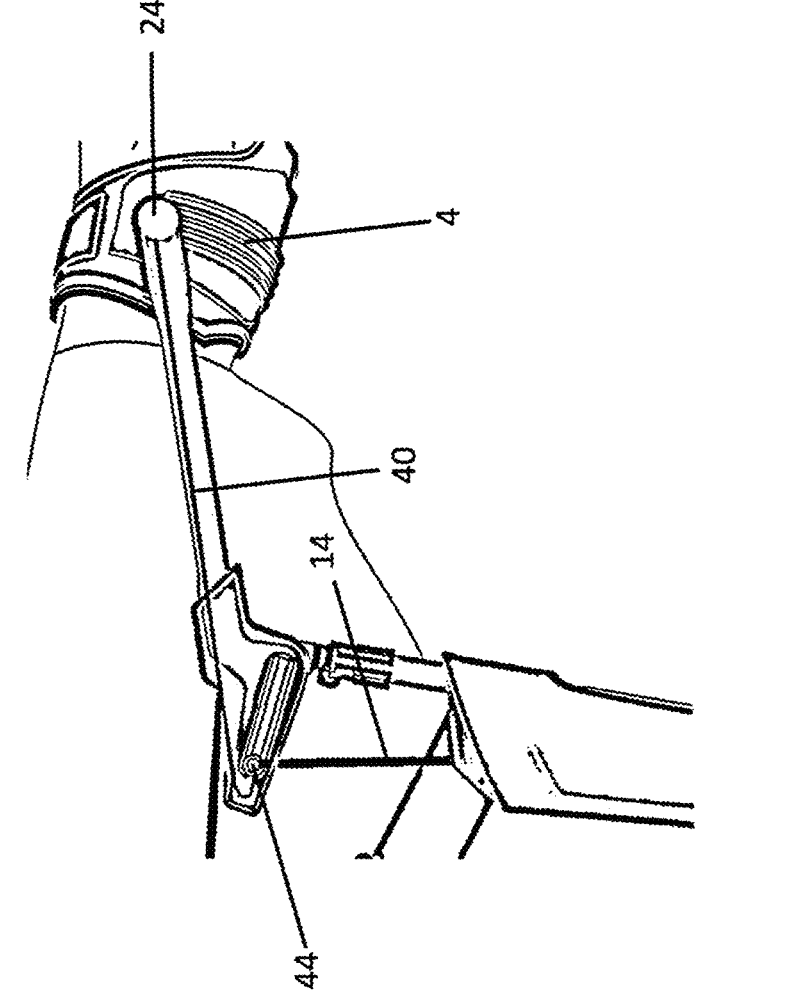
Figure 9:
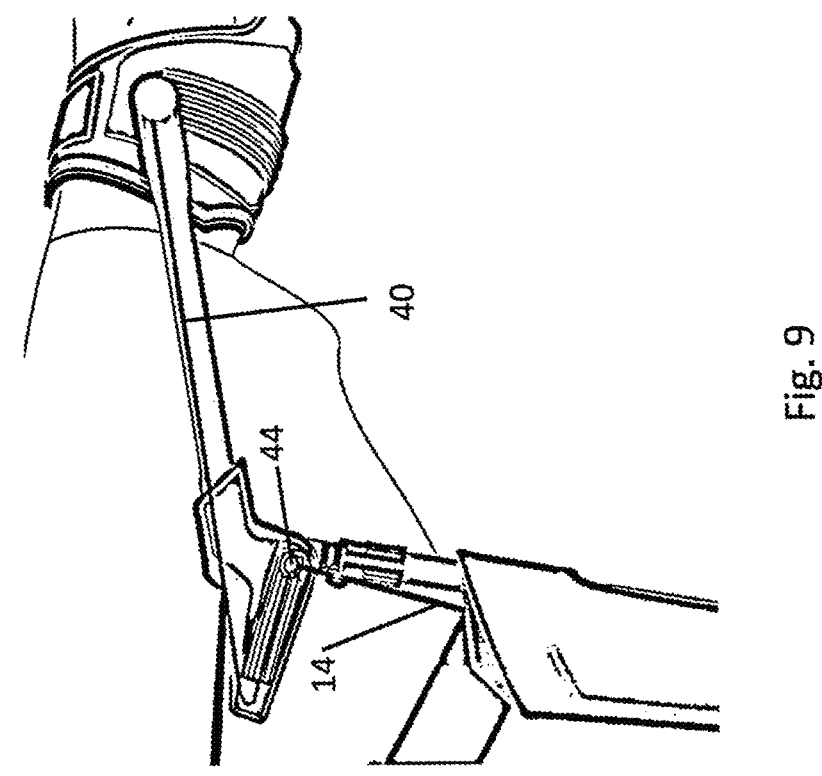

FIG. 8 shows an alternative embodiment to the representation in FIGS. 6 and 7. Here, the tension element 40 is also connected to the actuating element 24 on the arm shell 4. However, the tension element 40 now acts at the application point 44, at which the passive actuator 14 also acts. In FIG. 8, the passive actuator 14 is in the first state. If the tensile force exerted by the tension element 40 is now reduced, another spring, not depicted here, ensures that the application point 44 is displaced towards the swivel axis. This reduces the applied force and the passive actuator 14 is in the second state. This is shown in FIG. 9.

Figure 10:
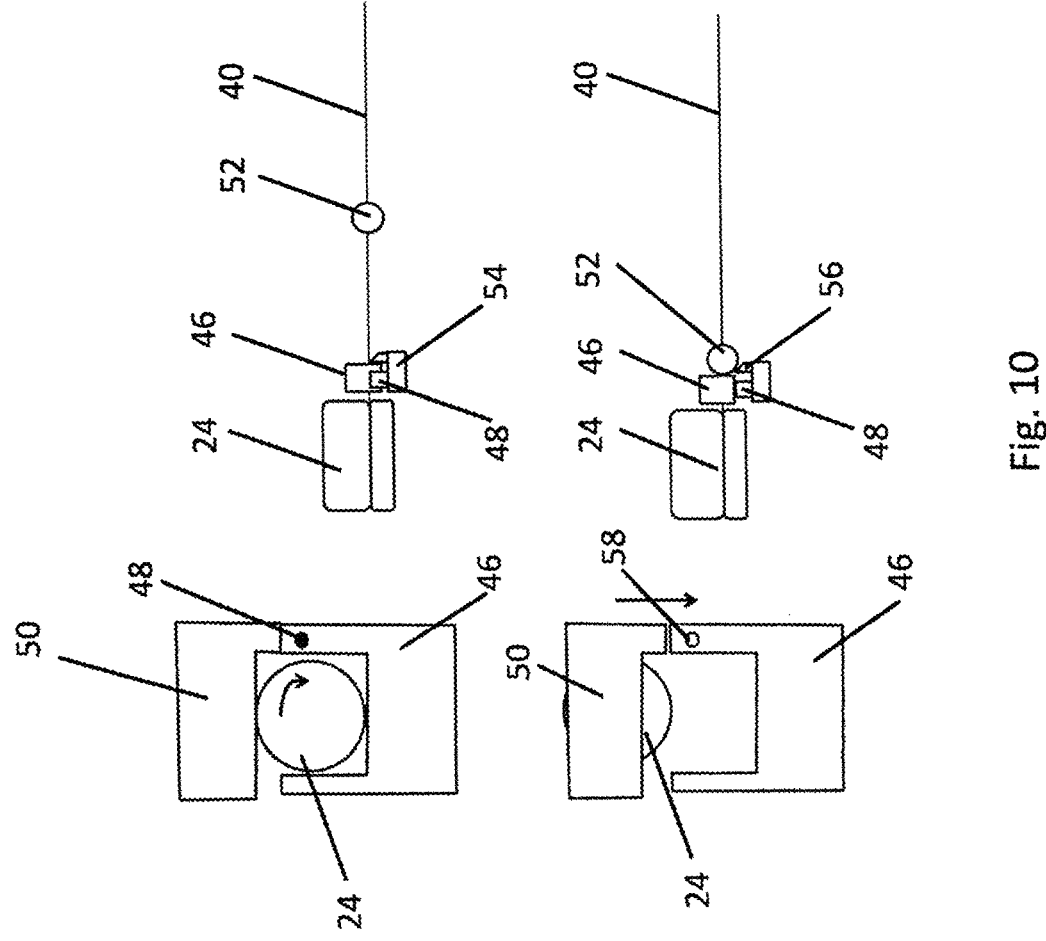

FIG. 10 shows schematic views of a securing device as can be used with a device of the type described here.

The left-hand part of FIG. 10 shows a schematic top view of the actuating element 24, which can, for example, be designed as a rotary knob or a so-called "BOA" element. In the right-hand part of FIG. 10, the actuating element 24 is shown in a side view. The actuating element 24 is configured to wind up or unwind the tension element 40 shown in the respective right-hand part of FIG. 10 and thus to bring the actuator from the first state into the second state. The upper part of FIG. 10 schematically depicts the situation in which the device is mounted and the arm shell 4 closed, the latter not being depicted in FIG. 10 for reasons of clarity. In the example of an embodiment shown, the arm shell 4 is closed via a strap, the connector 46 of which is schematically depicted. In the upper part of FIG. 10, at the top left, the connector 46 is shown in the closed state. It is secured via a pin 48, which extends vertically to the drawing plane in the upper left-hand representation in FIG. 10. In this state, the connector 46 pushes a protective cap 50, which can also be arranged on the arm shell, into the position shown at the top left, so that the actuating element 24 can be accessed. In this situation, the actuating element 24 can be actuated and the tension element 40 moved. A ball 52 is located on the tension element 40 which is also moved as soon as the tension element 40 is wound up or unwound by the actuating element 24. The pin 48 is also depicted in the right-hand part of FIG. 10. It is situated on a carrier element 54. In the upper part of FIG. 10, it can be seen that the pin 48 engages in the schematically depicted part of the connector 46, thereby preventing the connector 46 from being moved.

A different situation is depicted in the lower part of FIG. 10. The right-hand part of the lower half of FIG. 10 shows that the ball 52 has been moved to the right by actuating the actuating element 24 and winding up the tension element 40. The ball 52 comes into contact with a securing element 56, which has an inclined contact surface. The ball 52 is moved to the left by actuating the actuating element 24 and, due to the inclined contact surface, pushes the securing element 56 and thus also the carrier element 54 and the pin 48 therein downwards. As a result, it disen-gages from the connector 46. This is depicted in the lower left-hand part of FIG. by the engagement opening 58, which is shown empty. In this state, the connector 46 can be moved downwards, as shown by the arrow in the lower part of FIG. 10, and the arm shell 4, not depicted here, opened. This displaces the protective cap 50 into the positions depicted in the lower part of FIG. 10, so that the actuating element 24 is no longer accessible and can no longer be moved.

A range of effects are achieved with this securing device.

The actuating element 24 can only be actuated when the protective cap 50 is in the position shown in the upper part of FIG. 10. However, this is only possible once it has been displaced by the connector 46 and said connector is prefer-ably locked by the pin 48. Consequently, the actuator 14 can only be brought into the first state by the actuating element 24 when the connector 46 is closed and the arm shell 4 is thus securely in contact with the arm of the wearer. Other-wise, in the preferred embodiment shown, it is not possible to raise the passive actuator to the first state and thus the applied force to its maximum level.

The interaction of the ball 52 and the securing element 56 in the embodiment shown also ensures that the connector 46 can only be removed, and thus the arm shell 4 opened, when the ball 52 is in the position shown in the lower part of FIG. 10, i.e. has reached an end position. This is preferably the second state, in which the force exerted by the passive actuator on the arm support element is minimal.

FIG. 11 depicts a section of the device according to another example of an embodiment of the present invention. The arm support element 2 is arranged on the force trans-mission element 8 via the joint 6 such that it can be swivelled. The lever element 18 is connected to the arm support element 2, wherein the passive actuator 14 acts on said lever element at the application point 44. By means of a coupling joint 60, the lever element 18 can be detached from the arm support element 2 or at least folded down in the direction of the arrow 32. This relaxes the passive actuator 14 and thus no longer transmits any supporting force to the arm support element 2. When the lever element 8 is coupled to the arm support element 2 again, the joint 6 can be held in place by means of the tension band arranged on the force transmission element 8.

FIG. 12 depicts a section of the device according to another example of an embodiment of the present invention. Here, the device is in the first state in the left-hand part of FIG. 12 and in the second state in the right-hand part. In both parts, one can see the force transmission element 8, the arm support element 2 and the swivel joint 6 between them with the swivel axis about which the two elements can be swivelled around each other. The lever element 18 is also depicted on which the passive actuator 14 acts at an appli-cation point 44. A coupling joint 60, which is lockable, is located between the lever element 18 and the arm support element 2. In the left-hand part of FIG. 12, the coupling joint 60 is locked, so that the arm support element 2 cannot be swivelled relative to the lever element 18. The force trans-mitted by the actuator 14 to the lever element 18, resulting in the desired torque longitudinally about the swivel axis 6, is transmitted to the arm support element 2 via the locked coupling joint 60. In the right-hand part of FIG. 12, the coupling joint 60 is unlocked, so that the arm support element 2 can be swivelled relative to the lever element 18. Consequently, the force applied by the passive actuator, which is not shown in the right-hand part of FIG. 12 for reasons of clarity, is not transmitted to the arm support element 2, so that in this case the actuator has been brought into the second state.

FIG. 13 shows a similar construction with which the lever element 18 can be moved out of a first position, depicted by dashed lines and in which the actuator 14 is in the first state, into a second position, in which the lever element 18 is depicted by solid lines. In this case, the passive actuator 14 is in the second state, in which it is relaxed compared to the first state, so that a significantly lower force or no force at all is transmitted to the lever element 18. In the example of an embodiment shown, the coupling joint 60 is in overlap with the swivel joint 6. Again, a lockable and unlockable connection is made between the lever element 18 and the arm support element 2.

FIG. 14 shows another configuration. Here too, the lever element 18 is connected to the arm support element 2 and can be swivelled together with the latter about a swivel axis of the swivel joint 6 relative to the force transmission element 8. However, the lever element 18 cannot be moved relative to the arm support element 2. The application point 44 at which the passive actuator 14 acts on the lever element 18 is designed in such a way that it can be displaced along a rail 62. As a result, the distance between the application point 44 and the swivel axis of the swivel joint 6 can be varied, thereby allowing the lever arm of the force applied by the actuator 14 to the lever element 18 to be shortened or lengthened relative to this swivel axis. This also varies the applied torque and thus ultimately the supporting force applied by the actuator 14 to the arm support element 2. If, in the example of an embodiment shown in FIG. 14, the application point 14 is displaced up to the right-hand end stop, it is situated directly on the swivel axis of the swivel joint, so that a torque can no longer by transmitted.

Figure 16:
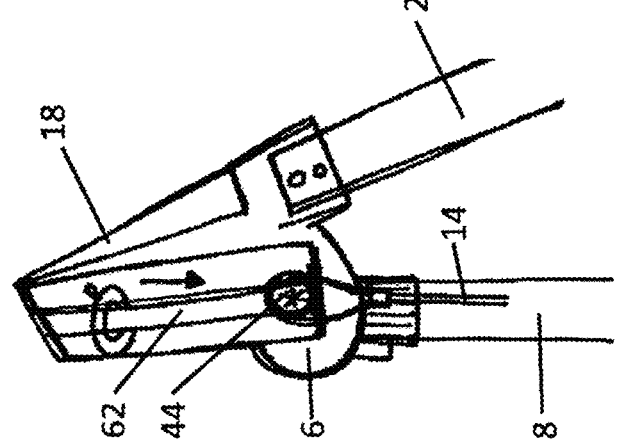
Figure 15:
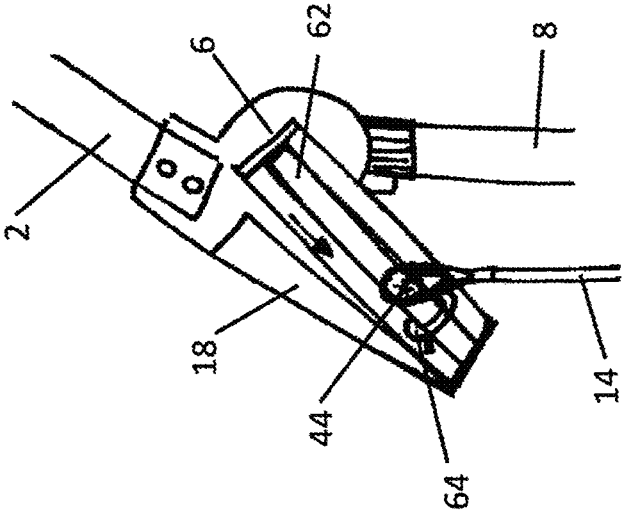

FIGS. 15 and 16 show a configuration of the device from FIG. 14 in which the actuating element is designed in such a way that it is actuated automatically by the device and brings the actuator into the first state or the second state, depending on the position of the arm support element 2 relative to the force transmission element 8.

The construction corresponds essentially to the embodi-ment shown in FIG. 14, differing in that the application point 44 cannot be locked; rather, it can slide freely along the rail 62. FIG. 15 depicts the situation in which an arm is raised. It can be seen that the arm support element 2 is directed upwards from the lever element 18. Due to the force applied by the actuator 14, the application point 44 slides into the position shown until it strikes a stop ring 64. Of course, other types of stop are also possible. It is only important that the movement of the application point 44 along the rail 62 in this direction is limited by a stop. For example, in the form of the stop ring 64 shown, the stop can be displaced along the rail 62 and locked to or on this rail 62. The force applied by the actuator consequently moves the application point 44 to the maximum position away from the swivel axis of the swivel joint 6. The applied torque and therefore also the force applied to the arm support element 2 is thus maximized. Preferably, the application point can be locked in at least one desired position, preferably in every desired position, so that it cannot slide along the rail 62 without releasing the lock. Locking can be achieved, for example, by clamping jaws, a scissor clamp, magnetically or by a locking element, for example a pin that can be inserted into a locking bore.

FIG. 16 shows the situation when the arm is lowered. It can be seen that the arm support element 2 is directed downwards from the swivel joint 6. In this case, the application point 44 is displaced in the opposite direction by the force applied by the actuator 14, as shown in FIG. 16. Here, too, there is a stop which limits the displacement and movement of the application point 44. In the example of an embodiment shown, the application point 44 in this situation is not only closer to the swivel axis of the swivel joint, which would in principle be sufficient to define a second state, but it is in overlap with the swivel axis, so that the applied torque disap-pears.

With reference to embodiments for an upper arm support-ing device, reference is made to FIGS. 17-39.

Figure 17:
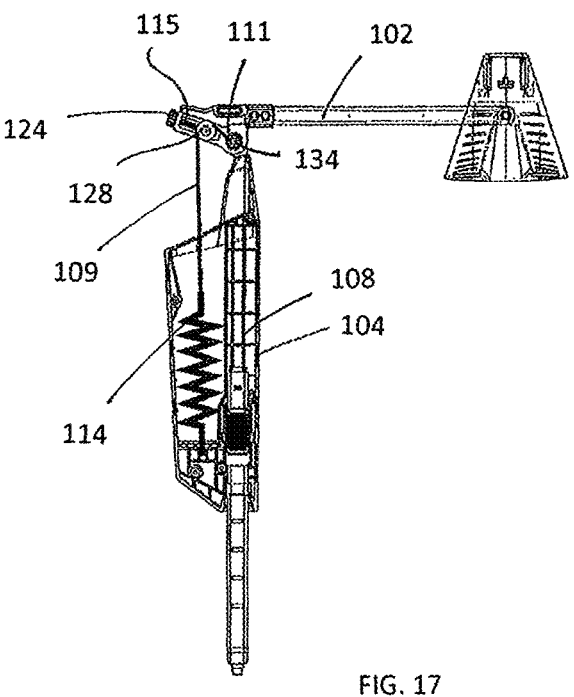
FIGS. 17 to 19—schematic representations of an upper arm supporting device according to an example of an embodiment of the present invention in various positions, FIGS. 20 and 21—an upper arm supporting device according to an example of an embodiment of the present invention in the mounted state, FIGS. 22 to 33—schematic representations of a section of an upper arm supporting device according to various examples of embodiments of the present invention, FIG. 34—a schematic section of an upper arm supporting device according to an example of an embodiment of the present invention, and FIGS. 35 to 38—further schematic representations of a section of an upper arm supporting device according to various examples of embodiments of the present invention.

FIG. 17 schematically depicts an arm support element 102 and a force transmission element 104, which are arranged about a swivel axis 134 of a joint such that they can be swivelled relative to each other. A passive actuator 108, which has a transmission element 109 belonging to it, is configured to apply a force. The first end 111 of the passive actuator 114 is fixed to the swivel axis 134. The passive actuator 114 rests against a deflector element 128, which is designed as a circular deflector disc in the example of an embodiment shown. The deflector element 128 can be displaced and fixed in different positions by means of a threaded rod 115, which can be rotated via an actuating device 124, for example in the form of a knurled screw. On the one hand, this increases or decreases the distance to be bridged by the passive actuator 114 between the first end 111 and its second end, which is not depicted. This causes the force generated in the shown position of the arm support element 102 relative to the force transmission element 108 to vary. In addition, the direction in which the lower part of the passive actuator in FIG. 17, which extends downwards from the deflector element 128, also changes. This also causes the force applied to the arm support element 102 to vary.

Figure 18:
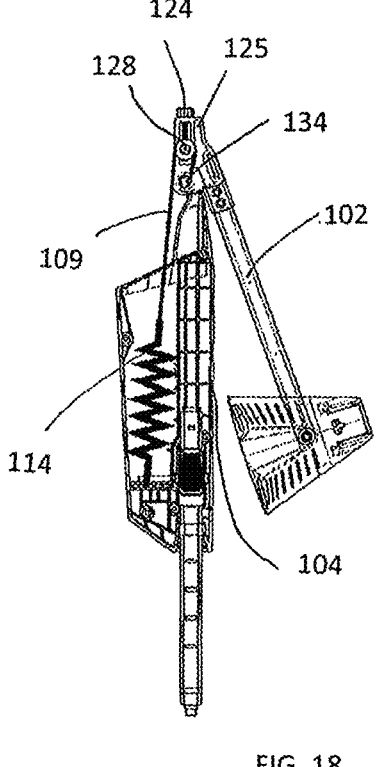

FIG. 18 shows the device from FIG. 17 with a lowered arm support element 102. The deflector element 128 is arranged on a force application lever 125, which is con-nected to the arm support element 102 such that it is torque-proof. Since the arm support element 102 has been swivelled about the swivel axis 134 relative to the force transmission element 104, the force application lever 125 and thus the deflector element 128 fixed to it have also been displaced. The passive actuator 114 has been energetically charged: in the present example, it has been stretched. The force that it exerts has thus been increased in comparison to the situation in FIG. 17. At the same time, the transmission element 109 through which the force is transmitted now runs along the swivel axis 134, so that the lever arm with which the force is transmitted to the force application lever 125 is reduced. So, while the actuator 114 itself exerts a greater force, this results in less torque being exerted on the arm support element 102 about the swivel axis 134.

The force supporting an arm is consequently reduced. FIG. 18 shows an end position of the device. The arm support element 102 rests against the force transmission element 108 in the region of the swivel axis 134. In the example of an embodiment shown, in this position the actuator and in particular its transmission element 109 do not pass through the swivel axis 134, but close to it.

Figure 19:
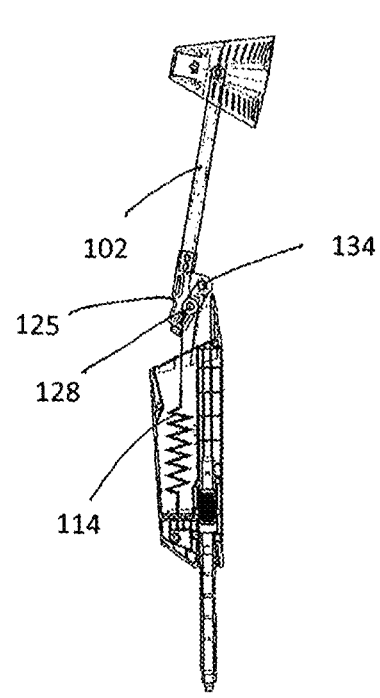

FIG. 19 depicts the device from FIGS. 17 and 18 in a third position. Here, the arm support element 102 has been raised about the swivel axis 134. As a result, the force application lever 125 and the deflector element 128 fixed to it also move. In the example of an embodiment shown, this causes a relaxation of the actuator 108, thereby reducing the force it applies.

Figure 20:
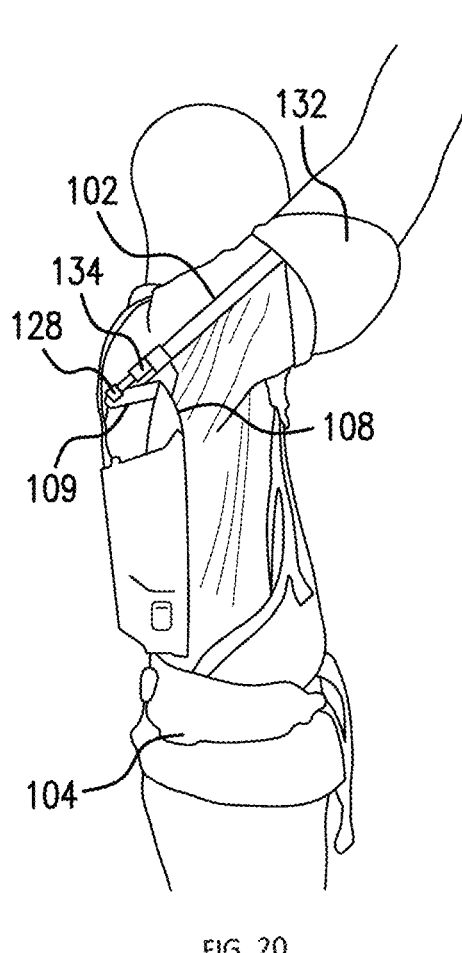
Figure 21:
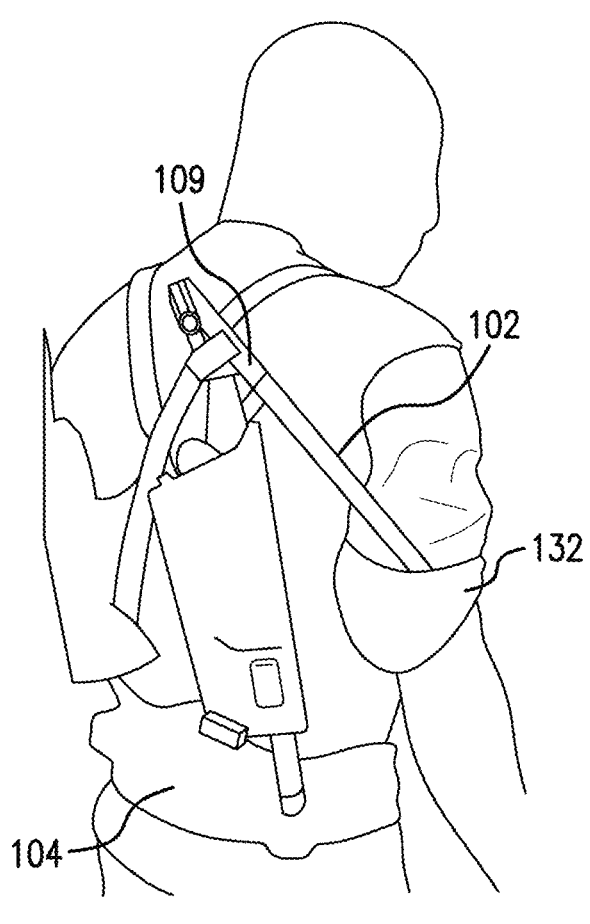

FIGS. 20 and 21 show a device according to FIGS. 17 to 19 in the mounted state. An arm of the user is arranged in an arm shell 132, which is positioned on an arm support element 102. The force transmission element 108 is situated in a sleeve and is thus only partially depicted. However, the transmission element 109 can be seen, which is part of the passive actuator and is guided across the deflector element 128. It is fixed in the region of the swivel axis 134, as can be seen more clearly in FIGS. 17 to 19. FIGS. 20 and 21 also feature a counter bearing element 104 which is designed as a hip strap.

Figure 22:
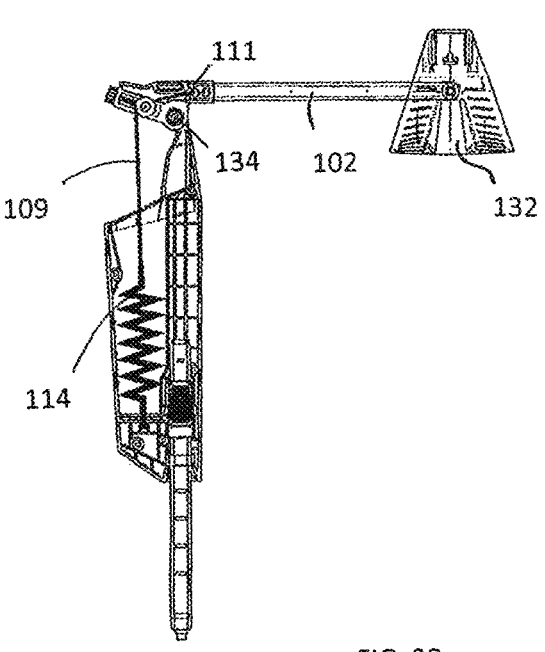

FIG. 22 shows a device according to FIGS. 17 to 19 that differs in one detail. The first end 111 of the passive actuator 108, which is part of the transmission element in the example of an embodiment shown, is not fixed to the swivel axis 134, but to the arm support element 102. This does not affect the function.

Figure 23:
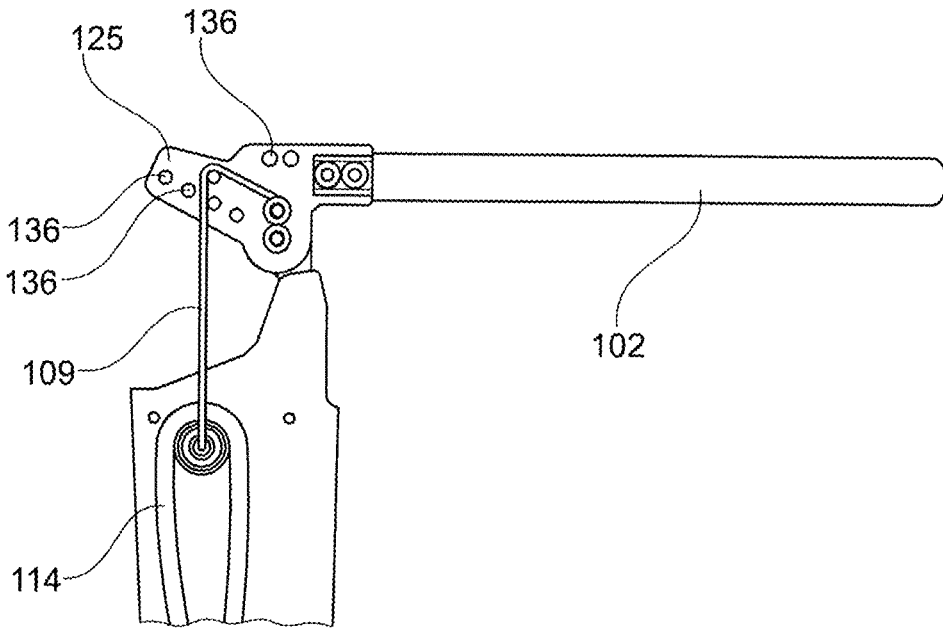

FIG. 23 shows an enlarged section of a device according to an example of an embodiment of the present invention. The passive actuator 114 features an elastic band on which a transmission element 109 is arranged, said element also forming part of the actuator 108. The force application lever 125 has several pegs 136, each of which constitute a deflector element 128. The transmission element 109 is guided across at least one of these pegs 136 and fixed to the arm support element 102.

Figure 24:
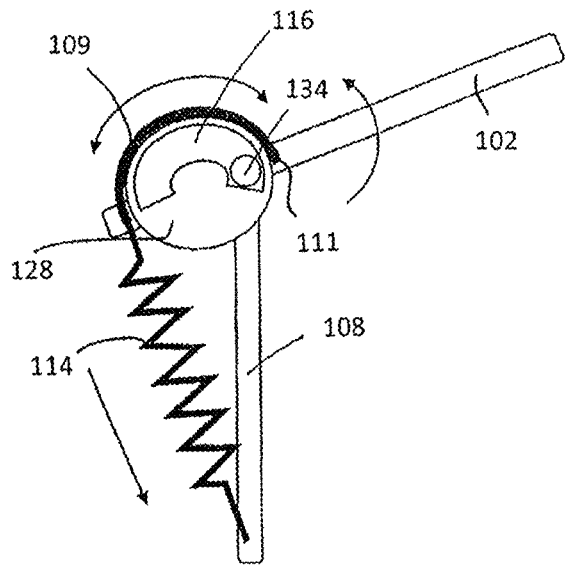

FIG. 24 shows a similar configuration. However, the deflector element 128 is now not designed as a circular disc, but has a free form. However, the passive actuator 114 also rests here against the outer circumference of the deflector element 128. The deflector element 128 features a slot 116, through which a pin, not depicted here, attached to the swivel axis 134 is passed. The deflector element 128 can thus be displaced relative to the swivel axis 134 by displac-ing the pin along the slot 116. In addition, the deflector element 128 can be rotated about the pin and therefore about the swivel axis 134. In this way, the distance between the first end 111, which is formed by the transmission element 109 in the example of an embodiment shown, and the second end, not depicted, of the passive actuator 114 as well as the direction of the second part of the actuator 114 can be changed. An alternative embodiment is depicted by a dashed line in which the first end 111 of the actuator 114 is arranged on the force transmission element 108.

In the right-hand area of FIG. 24, a deflector element 128 is shown as an example, the slot 116 of which is designed as a freely formed recess. This representation serves to illustrate that the shape of the slot 116 does not have to have a fixed width, nor does it have to follow a possibly curved line. Both features are advantageous, but not essential.

Figure 25:
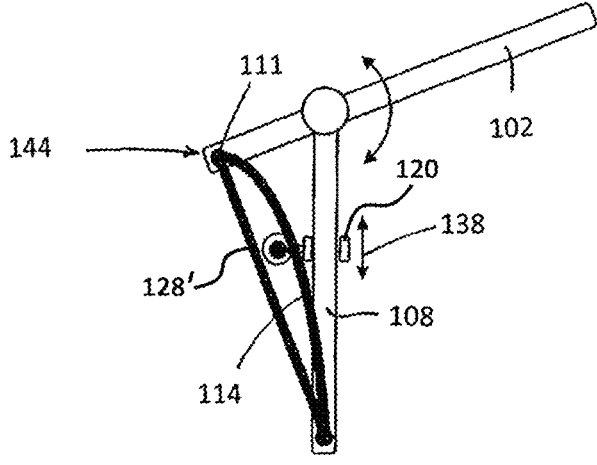

FIG. 25 shows a further configuration according to the present invention. The passive actuator 114 is arranged with its first end 111 at a force application point 144 and extends across a deflector element 128', which is positioned on a slide 120. In the example of an embodiment shown, this slide can be displaced along the double arrow 138, i.e. along the force transmission element 108. In particular, this changes the direction of the part of the passive actuator 114 that extends between the force application point 144, i.e. the first end 111 of the actuator 108, and the deflector element 128.

Figure 26:
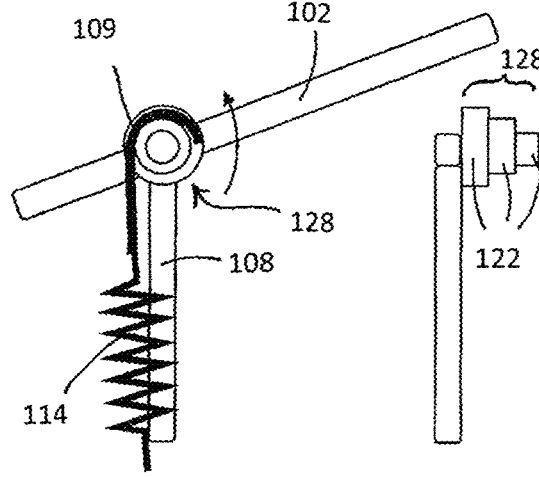

FIG. 26 shows a further configuration of the present invention. The arm support element 102, which is only schematically depicted, is again arranged on the force transmission element 108 such that it can be swivelled. The deflector element 128 is shown in FIG. 26 as a series of discs. The right-hand part of FIG. 26 shows a side view, in which the individual discs 122 can be clearly seen. In the example of an embodiment shown, they are arranged concentrically and in the shape of a circle. This is advantageous, but not essential. The passive actuator 114 extends along the outer contour of one of the discs 122. If the force is to be adjusted and changed, the actuator is guided across the outer edge, i.e. the contour, of a different disc 122.

Figure 27:
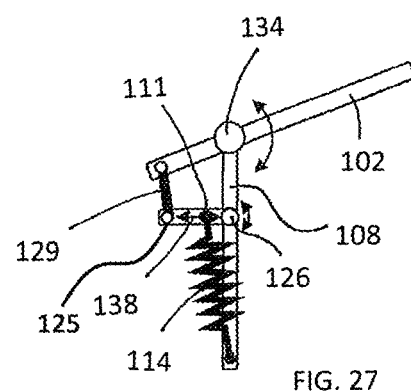

FIG. 27 shows a further configuration of the device. Here, the arm support element 102 is also arranged on the force transmission element 108 about a swivel axis 134. A force application lever 125 is located on the force transmission element 108, the first end 111 of the passive actuator 114 being arranged on said lever. The force application lever 125 is arranged on the force transmission element 108 such that it can be swivelled about an axis 126. The point at which the first end 111 of the passive actuator 114 is arranged on the force application lever 125 can be displaced along the double arrow 138. On the one hand, this changes the pre-load of the actuator 114 and the direction in which it applies its force. The force exerted by the actuator 114 on the force application lever 125 is transmitted to the arm support element 102 via a tension connection 129, which in this case forms the transmission element 109.

Figure 28:
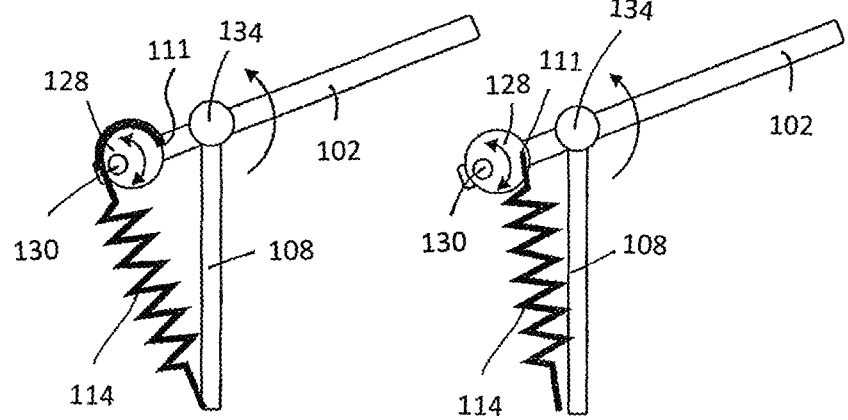

FIG. 28 shows another configuration of a device according to an example of an embodiment of the present invention in two different arrangements. Both representations show the arm support element 102, which is arranged on the force transmission element 108 such that it can be rotated about the swivel axis 134. The deflector element 128 is designed as a circular disc and arranged on the arm support element 102 such that it can be rotated about an axis of rotation 130. The first end 111 of the actuator 114 is fixed to the deflector element 128. The two representations in FIG. 28 differ in a rotation of the deflector element 128 about the axis of rotation 130. Whereas in the right-hand representation in FIG. 28, the first end 111 of the actuator 114 is positioned in such a way that, starting from this point and moving in a clockwise direction, the actuator rests against the deflector element 128, this is different in the left-hand representation in FIG. 22. There, a part of the actuator extends anti-clockwise on the deflector element 128.

Figure 29:
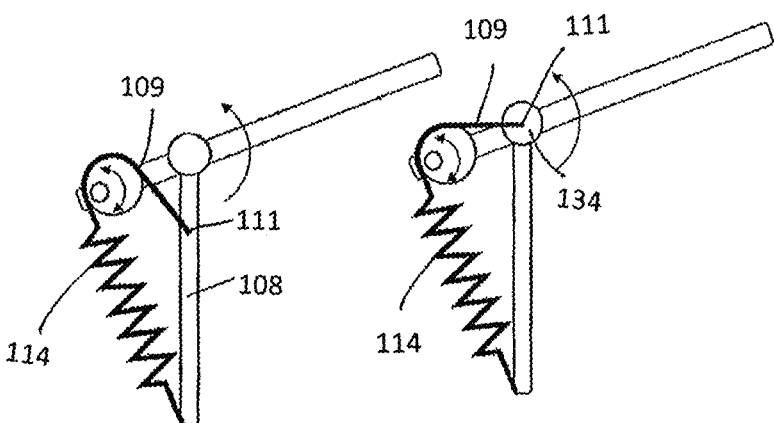

FIG. 29 shows another configuration. Both representations in FIG. 29 are very similar to the representations in FIG. 28 and differ essentially in where the first end 111 of the passive actuator 108, which in this case is formed by one end of the transmission element 109, is attached. In the left-hand representation in FIG. 113, the first end 111 is located on the force transmission element 108. In the right-hand representation in FIG. 29, it is fixed to the swivel axis 134.

Figure 30:
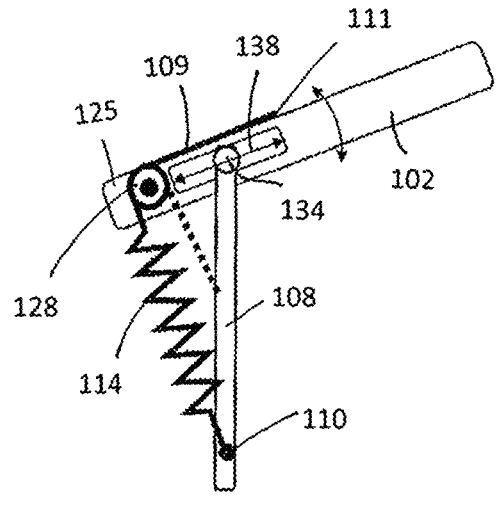

FIG. 30 depicts a configuration of a device according to a further example of an embodiment of the present invention. The deflector element 128 is positioned on the force application lever 125, which is part of the arm support element 102 and is connected to said element such that it is torque-proof. The entire arm support element 102 is designed such that it can be displaced along the double arrow 138 relative to the force transmission element 103 and the swivel axis 134. The first end 111 of the transmission element 109, which is again part of the actuator 108, is fixed to the arm support element 102. Displacing the arm support element 102 along a direction of the double arrow 138 changes in particular the direction in which the actual actuator 114 runs. This direction extends from the deflector element 128 to the second end 110 of the passive actuator 108. In addition, the length of the force application lever 125 and therefore the effective length of the force applied by the actuator changes.

Figure 31:
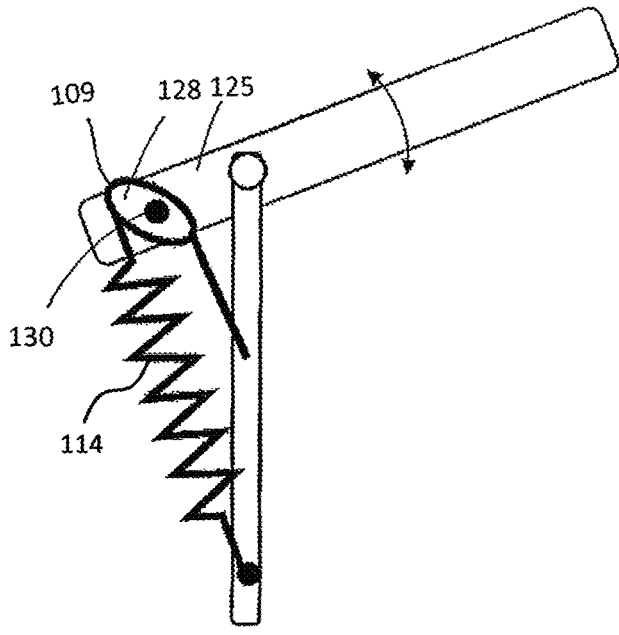

In FIG. 31, the deflector element 128 is positioned on the force application lever 125 and features an oval outer contour, along which the transmission element 109 as part of the actuator is guided. The deflector element 128 can be rotated about an axis of rotation 130 and fixed in different orientations relative to the force application lever 125. This allows the pre-load of the actuator 108, the direction in which the actuator 114 extends towards its second end 110 and the length of the effective force application lever 125 to be adjusted.

Figure 32:
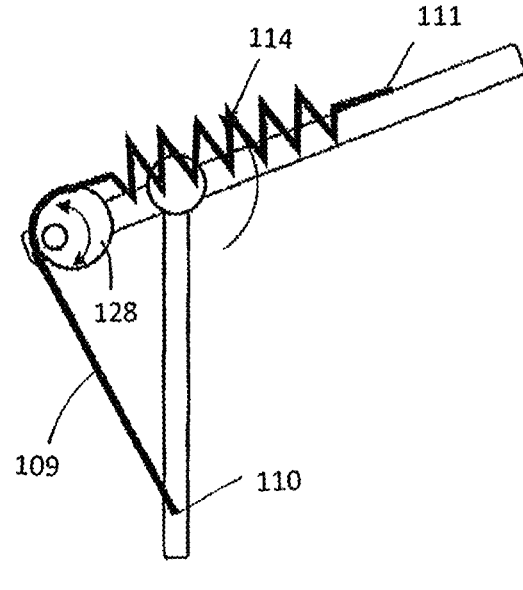

FIG. 32 shows a configuration in which the actual actuator 109, which may be a spring element or an elastic element for example, is situated between its first end 111 and the deflector element 128. The transmission element now forms the second end 110 of the passive actuator.

Figure 33:
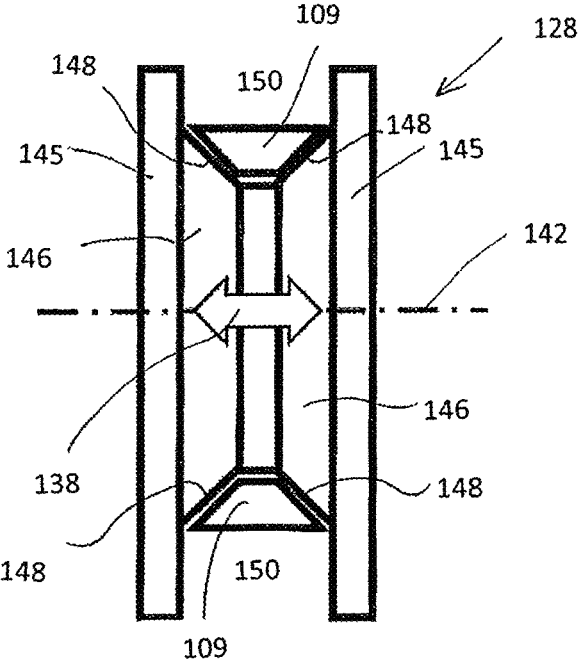

FIG. 33 depicts a configuration of a deflector element 128 that is designed as a deflector disc. It is preferably rotationally symmetrical and has an axis of symmetry 142, which runs from left to right in FIG. 33. The deflector element 128 features two jaws 145, which can be moved towards and away from each other along the double arrow 138. On their side facing the other jaw 145, they each have a quenched element 146 with a sloping side 148. The deflector element 128 is therefore designed as a deflector disc with a circumferential groove 150. In the example of an embodiment shown, the transmission element 109 runs in this groove 150. It has a cross-section that is adapted to the shape of the groove 150, said cross-section being trapezoidal in the example of an embodiment shown. If the two jaws 145 are now moved away from each other, the distance between the two sloping elements increases and the groove 150 becomes wider. Due to the trapezoidal design of the cross-section of the transmission element 109, it slides further towards the axis of symmetry 142, thereby shortening the effective circumference of the deflector element 128. This allows the pre-load of the passive actuator as well as the effective lever length and the direction in which the actual actuator extends to be changed.

Figure 34:
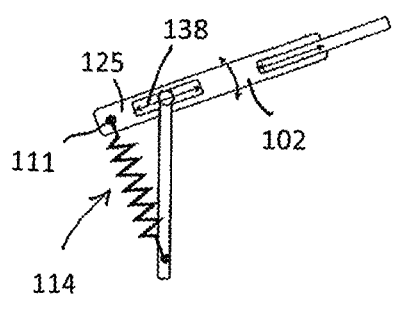

The device according to FIG. 34 features an actuator 114 whose first end 111 is arranged on the force application lever 125, which is connected to the arm support element 102 such that it is torque-proof. The arm support element 102 with the force application lever 125 arranged on it can be displaced along the double arrow 138, thereby changing the effective lever length. Since this would also displace an arm shell arranged on the arm support element 102, the arm support element is designed to be adjustable in length.

Figure 35:
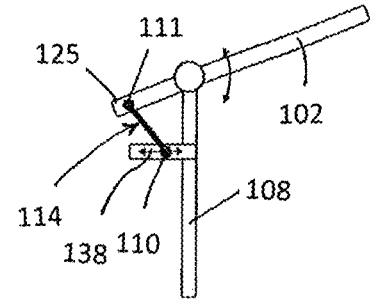

In the device according to FIG. 35, the actuator 114 is positioned with its first end 111 on the force application lever 125. The second end 110, however, is positioned on a component provided for this purpose such that it can be displaced along the double arrow 138.

Figure 36:
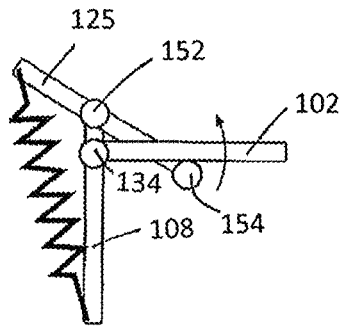

In the device according to FIG. 36, the force application device 125 is positioned on the force transmission element 108 such that it can be swivelled about a swivel axis 152, wherein the swivel axis 152 does not coincide with the swivel axis 134. The arm support element 102 is moved via a projection 154 which is arranged on the force application lever 125 and engages with the arm support element 102.

Figure 37:
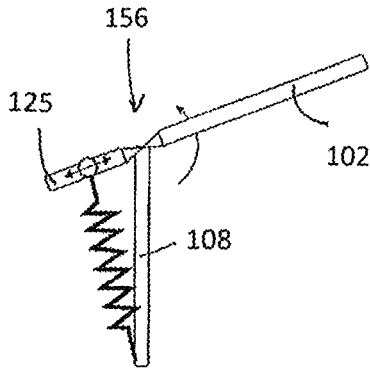

The device according to FIG. 37 has a special feature in the form of a movement device 156 by means of which the force transmission element 108, the arm support element 102 and/or the force application lever 125 are connected such that they can be moved relative to each other. This movement device 156 allows movement but does not have a fixed swivel axis, so that the movement is freer and can respond better to mechanical loads.

Figure 38:
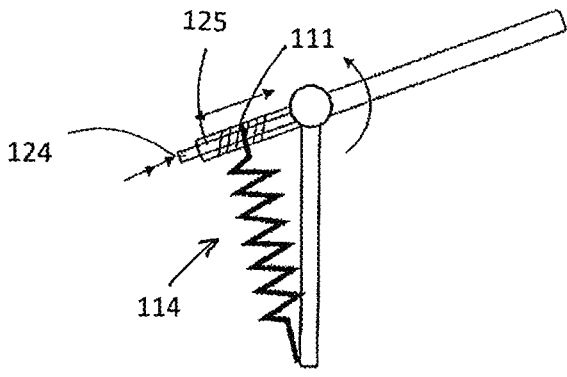

In the device according to FIG. 38, the force application lever 125 is equipped with an outer thread to which the first end 111 of the actuator 114 is fixed. The thread can be rotated by means of the actuation device 124, wherein the actuator 114 is wound up or unwound. As a result, the force application point is also displaced and the pre-load of the actuator changed.

REFERENCE LIST FOR EMBODIMENT FOR
SUPPORTING AT LEAST ONE ARM OF A
USER

2 arm support element
4 arm shell
6 swivel joint
8 force transmission element
10 lower end
12 counter bearing element
14 passive actuator
16 Bowden cable
18 lever element
20 end
22 fastening element
24 actuating element
26 fastening position
28 pulley
30 tension lever
32 arrow
34 swivel axis
36 sub-element
38 clamping element
40 tension element
42 connector
44 application point
46 connector
48 pin
50 protective cap
52 ball
54 carrier element
56 securing element
58 engagement opening
60 coupling joint
62 rail
64 stop ring Reference List for Embodiment for Supporting at Least One Upper Arm of a User

102 arm support element
104 counter bearing element
108 force transmission element
109 transmission element
110 second end
111 first end
114 passive actuator
115 threaded rod
116 slot
120 slide
122 disc
124 actuating device
125 force application lever
126 axis
128 deflector element
129 tension connection
130 axis of rotation
132 arm shell
134 swivel axis
136 peg
138 double arrow
142 symmetrical axis
144 force application point
145 jaw
146 quenched element
148 sloping side
150 groove
152 swivel axis
154 projection
156 movement device

The invention claimed is:

1. A device for supporting at least one upper arm of a user, comprising:

at least one arm support element comprising a means to support an upper arm of the user;

at least one passive actuator configured for applying a force to the at least one arm support element;

at least one tension or transmission element positioned between the at least one passive actuator and the at least one arm support element;

at least one adjusting element configured to adjust and set an amount of the force applied to the at least one arm support element by the at least one passive actuator and the at least one tension or transmission element; and at least one counter bearing element configured to counter the force applied to the at least one arm support element by the at least one passive actuator, wherein a first end of the at least one tension or transmission element is connected to the at least one passive actuator, wherein a second end of the at least one tension or transmission element is connected to the at least one adjusting element, wherein the at least one tension or transmission element passes through a spring biased displaceable application point, and wherein the at least one adjusting element is configured to wind up the at least one tension or transmission element, wherein winding up the at least one tension or transmission element with the at least one adjusting element pulls the at least one passive element towards the at least one arm support by displacing the spring biased displaceable application point.

2. A device for supporting at least one upper arm of a user, comprising:

at least one arm support element comprising a means to support an upper arm of the user;

at least one passive actuator configured for applying a force to the at least one arm support element;

at least one tension or transmission element positioned between the at least one passive actuator and the at least one arm support element;

at least one adjusting element configured to adjust and set an amount of the force applied to the at least one arm support element by the at least one passive actuator and the at least one tension or transmission element; and at least one counter bearing element configured to counter the force applied to the at least one arm support element by the at least one passive actuator, wherein a first end of the at least one tension or transmission element is connected to the at least one passive actuator by a connector, wherein a second end of the at least one tension or transmission element is connected to the at least one adjusting element; and wherein the at least one adjusting element is configured to wind up the at least one tension or transmission element, wherein winding up the at least one tension or transmission element with the at least one adjusting element pulls the at least one passive element towards the at least one arm support at the connector.

\* \* \* \* \*